US007636892B2

(12) United States Patent
Elie (10) Patent No.: US 7,636,892 B2
(45) Date of Patent: Dec. 22, 2009

(54) GRAPHICAL USER INTERFACE (GUI), METHOD, SYSTEM AND PROGRAM PRODUCT FOR GENERATING USABILITY DATA FOR A REMOTE COMPUTER USER

(75) Inventor: Claude J. Elie, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 963 days.

(21) Appl. No.: 10/873,048

(22) Filed: Jun. 22, 2004

(65) Prior Publication Data

US 2005/0283736 A1    Dec. 22, 2005

(51) Int. Cl.
*G06F 3/00* (2006.01)
(52) U.S. Cl. .................... 715/751; 715/704; 717/121
(58) Field of Classification Search .......... 715/704, 715/759, 751; 717/121
See application file for complete search history.

(56) References Cited

U.S. PATENT DOCUMENTS

| 5,086,393 | A  | * | 2/1992  | Kerr et al. .................. 702/186 |
| 5,872,909 | A  |   | 2/1999  | Wilner et al.                          |
| 6,269,412 | B1 |   | 7/2001  | Liu et al.                             |
| 6,324,659 | B1 |   | 11/2001 | Pierro                                 |
| 6,425,006 | B1 |   | 7/2002  | Chari et al.                           |
| 6,526,526 | B1 | * | 2/2003  | Dong et al. .................. 714/46  |
| 6,542,845 | B1 |   | 4/2003  | Grucci et al.                          |
| 6,557,120 | B1 |   | 4/2003  | Nicholson et al.                       |
| 7,018,696 | B2 | * | 3/2006  | Nee .......................... 428/64.1 |
| 2005/0254775 | A1 | * | 11/2005 | Hamilton et al. ............. 386/46 |

OTHER PUBLICATIONS

U.S. Appl. No. 60/558,692, Hamilton et al., pp. 1-12.*
U.S. Appl. No. 60/558,692, Hamilton et al., drawings and additional description, pp. 1-69.*
Bowater et al., IBM Technical Disclosure Bulletin, "Automatic Checking for Computer Terminal System Test Equipment", vol. 22, No. 11, Apr. 1980, pp. 5119-5120.

* cited by examiner

*Primary Examiner*—Dennis Bonshock
(74) *Attorney, Agent, or Firm*—William Schiesser; Hoffman Warnick LLC (57) ABSTRACT

The present invention provides a GUI, method, system and program product for generating usability data for a remote computer user. The GUI consumes minimal screen real estate and remains on top of all other applications. The GUI generally includes a timer for timing a task of the remote computer user; a task title field for displaying a title corresponding to the task; a comment entry field for inputting comments corresponding to a performance of the task by the remote computer user; and a way to indicate a type of each of the comments input. As the remote computer user performs a task, a tester will input comments using the GUI, and then assign each comment a type. A numerical count is maintained for certain types of comments. Usability data is generated based on the comments, the types and the numerical counts.

23 Claims, 8 Drawing Sheets

| | Subject | Task | Time | Timer | Log Number | Note Type | Note | Problems | Errors | Critical Errors |
|---|---|---|---|---|---|---|---|---|---|---|
| 1 | | | | | | | | | | |
| 2 | 1 | Task 1 | 11:05:12 AM | 0:00:00 | 1 | Start Timer | | | | |
| 3 | 1 | Task 1 | 11:05:21 AM | 0:00:09 | 2 | Error | clicked the wrong button | | | |
| 4 | 1 | Task 1 | 11:05:39 AM | 0:00:27 | 3 | Note | prompted user to think out loud more | | | |
| 5 | 1 | Task 1 | 11:06:01 AM | 0:00:49 | 4 | Problem | confused about where to start | | | |
| 6 | 1 | Task 1 | 11:06:13 AM | 0:01:01 | 5 | Critical Error | gave up | 1 | 1 | 1 |
| 7 | 1 | Task 1 | 11:06:14 AM | 0:01:01 | 6 | End Task | | | | |
| 8 | 1 | Task 2 | 11:06:17 AM | 0:00:00 | 7 | Start Timer | | | | |
| 9 | 1 | Task 2 | 11:06:47 AM | 0:00:30 | 8 | User Quote | I love this thing! | | | |
| 10 | 1 | Task 2 | 11:07:38 AM | 0:01:21 | 9 | HIGHLIGHT!! | I'm gonna throw this thing out the window | | | |
| 11 | 1 | Task 2 | 11:07:56 AM | 0:01:38 | 10 | Help | accessed help | | | |
| 12 | 1 | Task 2 | 11:08:17 AM | 0:02:00 | 11 | Help | can't find right section | | | |
| 13 | 1 | Task 2 | 11:08:26 AM | 0:02:08 | 12 | Help | found the right topic | | | |
| 14 | 1 | Task 2 | 11:08:32 AM | 0:02:14 | 13 | Note | success! | | | |
| 15 | 1 | Task 2 | 11:08:33 AM | 0:02:15 | 14 | End Task | | 0 | 0 | 0 |
| 16 | 1 | Task 3 | 11:08:39 AM | 0:00:00 | 15 | Start Timer | | | | |
| 17 | 1 | Task 3 | 11:08:54 AM | 0:00:14 | 16 | Note | moving flawlessly | | | |
| 18 | 1 | Task 3 | 11:09:27 AM | 0:00:47 | 17 | Problem | thinks they are connected | 1 | 0 | 0 |
| 19 | 1 | Task 3 | 11:09:37 AM | 0:00:57 | 18 | End Task | | | | |
| 20 | | | | | | | | | | |

FIG. 8

| | A | B | C | D | E | F | G | H |
|---|---|---|---|---|---|---|---|---|
| 1 | Summary Table for C:/temp1/CCMSUTest Summary.csv | | | | | | | |
| 2 | | | | | | | | |
| 3 | Task Summary Table | | | | | | | |
| 4 | Task Name | Participants | Avg Probe | Avg Errors | At Least 1 Crit | Success Rate(%) | Error Free Rate(%) | Avg TOT (Seconds)* |
| 5 | 1 - Create Site | 6 | 0 | 5 | 6 | 0 | 0 | N/A |
| 6 | 2 - Promote | 11 | 0 | 2.5 | 5 | 54.5 | 18.2 | 482.3 |
| 7 | 3 - Associate | 11 | 0 | 2.7 | 8 | 27.3 | 0 | 490.3 |
| 8 | 4 - 3rd Party | 11 | 0.1 | 1.6 | 5 | 54.5 | 27.3 | 323.7 |
| 9 | 5 - IGF Leasing | 9 | 0 | 0.9 | 4 | 55.6 | 44.4 | 221 |
| 10 | 6 - Update Site | 11 | 0 | 1 | 4 | 63.6 | 18.2 | 190.9 |
| 11 | 7 - Link/Unlink | 11 | 0 | 1.9 | 1 | 90.9 | 18.2 | 650.6 |
| 12 | | | | | | | | |
| 13 | Participant Summary Table | | | | | | | |
| 14 | Participant ID | Tasks | Avg Probe | Avg Errors | At Least 1 Crit | Success Rate(%) | Error Free Rate(%) | Avg TOT (Seconds)* |
| 15 | 1 | 7 | 0.1 | 2.6 | 3 | 57.1 | 28.6 | 603.8 |
| 16 | 2 | 7 | 0 | 1.7 | 4 | 42.9 | 28.6 | 309.3 |
| 17 | 3 | 6 | 0 | 2 | 2 | 66.7 | 50 | 215.5 |
| 18 | 4 | 7 | 0 | 2.7 | 4 | 42.9 | 0 | 619 |
| 19 | 5 | 6 | 0 | 1.5 | 3 | 50 | 16.7 | 433 |
| 20 | 6 | 5 | 0 | 1.4 | 3 | 40 | 20 | 412.6 |
| 21 | 7 | 5 | 0 | 1.8 | 2 | 60 | 20 | 209.7 |
| 22 | 8 | 7 | 0 | 1.7 | 2 | 71.4 | 28.6 | 464.6 |
| 23 | 9 | 7 | 0 | 2.3 | 6 | 28.6 | 0 | 593.5 |
| 24 | 10 | 7 | 0 | 2 | 3 | 57.1 | 14.3 | 425.2 |
| 25 | 11 | 6 | 0 | 2.8 | 2 | 66.7 | 0 | 407 |
| 26 | | | | | | | | |
| 27 | *Time On Task is calculated using only successfully completed tasks. | | | | | | | |
| 28 | | | | | | | | |
| 29 | | | | | | | | |
| 30 | Note: These data were calculated using the "End Task" note type Totals from the (Experiment name).csv file. | | | | | | | |
| 31 | If you edit the data be sure that your totals on the "End Task" lines are accurate and you save as a csv file. | | | | | | | |
| 32 | | | | | | | | |

130

GRAPHICAL USER INTERFACE (GUI), METHOD, SYSTEM AND PROGRAM PRODUCT FOR GENERATING USABILITY DATA FOR A REMOTE COMPUTER USER

FIELD OF THE INVENTION

In general, the present invention relates to a graphical user interface (GUI), method, system and program product for generating usability data for a remote computer user. Specifically, the present invention allows a tester to generate usability data on a computer system concurrently being used to observe a remotely located computer user as the remote computer user performs various computer-implemented tasks.

BACKGROUND OF THE INVENTION

As the use of Information Technology (IT) in business grows, it has become desirous to collect usability data related to the performance of tasks by end-users. For example, it could be advantageous to monitor how well users within a company operate certain programs and perform certain functions (e.g., such as logging into an intranet). In order to collect such data, the traditional approach has been for usability specialists (e.g., "testers") to bring users into a testing laboratory to observe how the users work with various software programs. In this environment, the testers would typically have a computer system dedicated to running data logging software that facilitates the collection of metrics and note taking about events that occur during the session (e.g., errors, time on tasks, user quotes, highlights, etc.).

More recently, testers have been trending towards collecting such data using collaboration-based software programs such as web conferencing software (e.g., E-MEETING, NET-MEETING, etc.) that allows the testers to see the events that are transpiring on the users' computers. This methodology allows for rapid data collection with worldwide participation at a fraction of the costs since users can participate without ever leaving their desks. Unfortunately, this methodology also has several drawbacks. For example, in using their own computer systems to connect to the users' computer systems, the testers' ability to use their computer systems as data loggers is greatly inhibited. Specifically, existing data logging software is designed for machines that are dedicated to logging a test, and not to machines logging a test while at the same time being used to actually observe a user. Moreover, since the existing data logging software programs have not been specifically designed to work in conjunction with collaboration-based software programs, managing screen real estate on a tester computer system has become a major issue. That is, under the current methodology, there is no preference given to the GUI for the data logging program versus the GUI(s) for the collaboration-based program. As such, the tester might be forced to constantly toggle between the multiple GUIs when seeking to input comments (or the like) into the data logging program.

In view of the foregoing, there exists a need for a GUI, method, system and program product for generating usability data for a remote computer user. Specifically, a need exists for a system that works in conjunction with collaboration-based programs so that usability data for remote computer users can be efficiently generated.

SUMMARY OF THE INVENTION

In general, the present invention provides a GUI, method, system and program product for generating usability data for a remote computer user. The GUI generally includes a timer for timing a task of the remote computer user, a task title field for displaying a title corresponding to the task; a comment entry field for inputting comments corresponding to a performance of the task by the remote computer user; and a way to indicate a type of each of the comments input. As the remote computer user performs a task, a tester will input comments using the GUI, and then assign each comment a type. A numerical count is maintained for certain types of comments. Usability data is generated based on the comments, the types and the numerical counts.

A first aspect of the present invention provides a graphical user interface (GUI) for generating usability data for a remote computer user, comprising: a timer for timing a task of the remote computer user; a task title field for displaying a title corresponding to the task; a comment entry field for inputting comments corresponding to a performance of the task by the remote computer user, wherein each of the comments is associated with a corresponding time as indicated by the timer; and means for indicating a type of each of the comments.

A second aspect of the present invention provides a method for generating usability data for a remote computer user, comprising: providing a graphical user interface (GUI) comprising a timer for timing a task of the remote computer user, a task title field for displaying a title corresponding to the task, a comment entry field for inputting comments corresponding to a performance of the task by the remote computer user, and means for indicating a type of each of the comments; initiating a monitoring session that provides viewing access to the remote computer user performing the task; and inputting comments into the comment entry field as the remote computer performs the task, and assigning a type to each of the comments using the means for indicating.

A third aspect of the present invention provides a system for generating usability data for a remote computer user, comprising: a GUI system for providing a graphical user interface (GUI) that comprises a timer for timing a task of the remote computer user, a task title field for displaying a title corresponding to the task, a comment entry field for inputting comments corresponding to a performance of the task by the remote computer user, and means for indicating a type of each of the comments; an input reception system for receiving comments corresponding to the performance of the task by the remote computer user as input into the comment entry field, and for receiving a type for each of the comments as selected using the means for indicating; and a data generation system for generating the usability data based on the comments and their corresponding types.

A fourth aspect of the present invention provides a program product stored on a recordable medium for generating usability data for a remote computer user, which when executed, comprises: program code for providing a graphical user interface (GUL) that comprises a timer for timing a task of the remote computer user, a task title field for displaying a title corresponding to the task, a comment entry field for inputting comments corresponding to a performance of the task by the remote computer user, and means for indicating a type of each of the comments; program code for receiving comments corresponding to the performance of the task by the remote computer user as input into the comment entry field, and for receiving a type for each of the comments as selected using the means for indicating; and program code for generating the usability data based on the comments and their corresponding types.

A fifth aspect of the present invention provides a system for deploying an application for generating usability data for a remote computer user, comprising: a computer infrastructure being operable to: provide a graphical user interface (GUI) that comprises a timer for timing a task of the remote computer user, a task title field for displaying a title corresponding to the task, a comment entry field for inputting comments corresponding to a performance of the task by the remote computer user, and means for indicating a type of each of the comments; receive comments corresponding to the performance of the task by the remote computer user as input into the comment entry field, and for receiving a type for each of the comments as selected using the means for indicating; and generate the usability data based on the comments and their corresponding types.

A sixth aspect of the present invention provides computer software embodied in a propagated signal for generating usability data for a remote computer user, the computer software comprising instructions to cause a computer system to perform the following functions: provide a graphical user interface (GUI) that comprises a timer for timing a task of the remote computer user, a task title field for displaying a title corresponding to the task, a comment entry field for inputting comments corresponding to a performance of the task by the remote computer user, and means for indicating a type of each of the comments; receive comments corresponding to the performance of the task by the remote computer user as input into the comment entry field, and for receiving a type for each of the comments as selected using the means for indicating; and generate the usability data based on the comments and their corresponding types.

Therefore, the present invention provides a GUI, method, system and program product for generating usability data for a remote computer user.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

BEST MODE FOR CARRYING OUT THE INVENTION

As indicated above, the present invention provides a GUI, method, system and program product for generating usability data for a remote computer user. The GUI generally includes a timer for timing a task of the remote computer user, a task title field for displaying a title corresponding to the task; a comment entry field for inputting comments corresponding to a performance of the task by the remote computer user; and a way to indicate a type of each of the comments input. As the remote computer user performs a task, a tester will input comments using the GUI, and then assign each comment a type. A numerical count is maintained for certain types of comments. Usability data is generated based on the comments, the types and the numerical counts.

Figure 1:
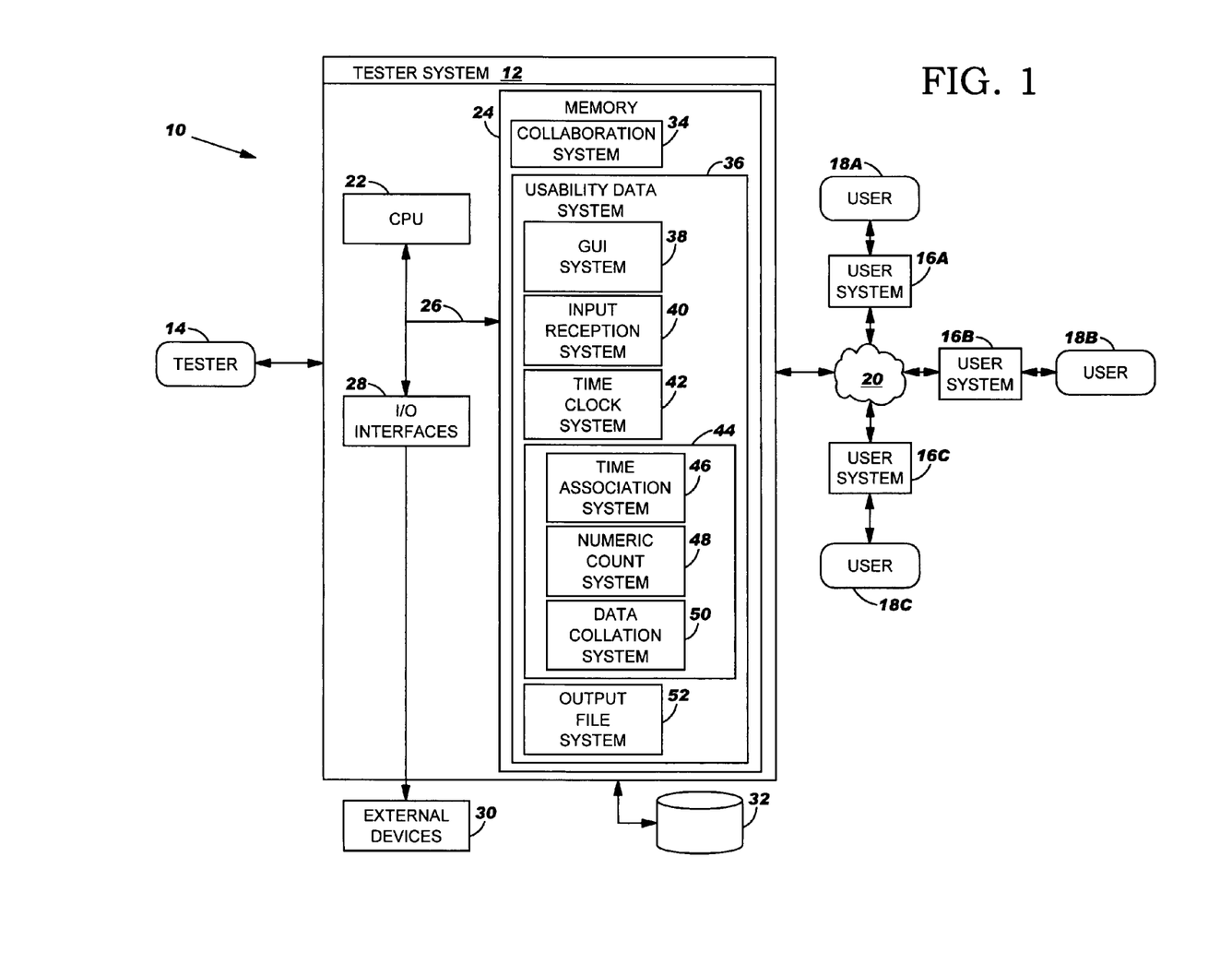
FIG. 1 depicts a system for generating and logging usability data according to the present invention.

Referring now to FIG. 1, a system 10 for generating and logging usability data for remote computer users 18A-C is shown. As depicted, system 10 includes tester system 12 (operated by tester 14), which communicates with user systems 16A-C (operated by remote users 18A-C) via network 20. Tester system 12 and user systems 16A-C are intended to present any types of computerized devices capable of carrying out the teachings described herein. For example, tester system 12 and user systems 16A-C could be desktop computer systems, workstations, laptop computers, etc. As will be further described below, tester system 12 is operated by tester 14 to observe users 18A-C remotely as they perform various computer-related tasks. Tester system 12 will also be used to log comments concerning user 18A-C's performance of those tasks, and to generated usability data based thereon.

Communication between tester system 12 and user systems 16A-C occurs remotely over network 20 or the like. Network 20 can be any type of network such as the Internet, a local area network (LAN), a wide area network (WAN), a virtual private network (VPN), etc. Communication between tester system 14 and user systems 16A-C could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, communication between tester system 12 and user systems 16A-C could occur in a client-server or server-server environment.

As further shown in FIG. 1, tester system 12 generally includes central processing unit (CPU) 22, memory 24, bus 26, input/output (I/O) interfaces 28, external devices/resources 30 and storage unit 32. CPU 22 may comprise a single processing unit, or be distributed across one or more processing units in one or more locations, e.g., on a client and server. Memory 24 may comprise any known type of data storage and/or transmission media, including magnetic media, optical media, random access memory (RAM), read-only memory (ROM), a data cache, a data object, etc. Moreover, similar to CPU 22, memory 24 may reside at a single physical location, comprising one or more types of data storage, or be distributed across a plurality of physical systems in various forms.

I/O interfaces 28 may comprise any system for exchanging information to/from an external source. External devices/resources 30 may comprise any known type of external device, including speakers, a CRT, LED screen, hand-held device, keyboard, mouse, voice recognition system, speech output system, printer, monitor/display, facsimile, pager, etc. Bus 26 provides a communication link between each of the components in tester system 12 and likewise may comprise any known type of transmission link, including electrical, optical, wireless, etc.

Storage unit 32 can be any system (e.g., a database, etc.) capable of providing storage for information under the present invention. Such information could include, for example, GUI data, comments, usability data, etc. As such, storage unit 32 could include one or more storage devices, such as a magnetic disk drive or an optical disk drive. In another embodiment, storage unit 32 includes data distributed across, for example, a local area network (LAN), wide area network (WAN) or a storage area network (SAN) (not shown). Although not shown, additional components, such as cache memory, communication systems, system software, etc., may be incorporated into tester system 12. In addition, it should be appreciated that although not shown, user systems 16A-C will likely include computerized components similar to tester system 12.

Shown in memory 24 of tester system 12 as program products are collaboration system 34 and usability data system 36. In general, collaboration system 34 is intended to represent any type of collaboration-based program that can be used to observe users 18A-C. For example, collaboration system 34 can be a web conferencing program such as E-MEETING and NETMEETING. As will be further described below, usability data system 36 is provided under the present invention to provide tester 14 with a set of GUIs that can be used to collect input corresponding to the performance of one or more tasks by users 18A-C (i.e., as observed using collaboration system 34), and to generate and log usability data concerning the performance.

As depicted, usability data system 36 includes GUI system 38, input reception system 40, time clock system 42, data generation system 44 and output file system 52. As further shown, data generation system 44 itself includes time association system 46, numeric count system 48 and data collation system 50. The functions of each of these systems will be described in detail below.

For illustrative purposes, assume that tester 14 wishes to observe user 18A performing certain computer-related tasks (e.g., using one or more programs loaded on users system 16A). In such an event, collaboration system 34 will provide tester 14 with a view of the activities occurring on user system 16A. GUI system 38 of usability data system 36 will provide tester 14 with a set of GUIs (e.g., displayed on a display/monitor of tester system 12) that can be used to, among other things: designate a set (e.g., one or more) of tasks which tester 14 wishes to observe user 16A performing; and collect comments from tester 14 concerning user 18A's performance of the task(s). Under the present invention the GUIs provided by GUI system 38 will remain on top of any other GUIs that tester 14 might have on his/her display/monitor. For example, any GUIs provided by collaboration system 34 will remain "under" the GUIs provided by usability data system 36. The avoids tester 14 from becoming distracted by other GUIs and/or having to constantly toggle through a series of GUIs to ensure that the GUIs of the present invention remain on top. It should be understood in advance that any selections/input made by tester 14 using the GUIs will be received and processed by input reception system 40 (as will be further described below).

Figure 2:
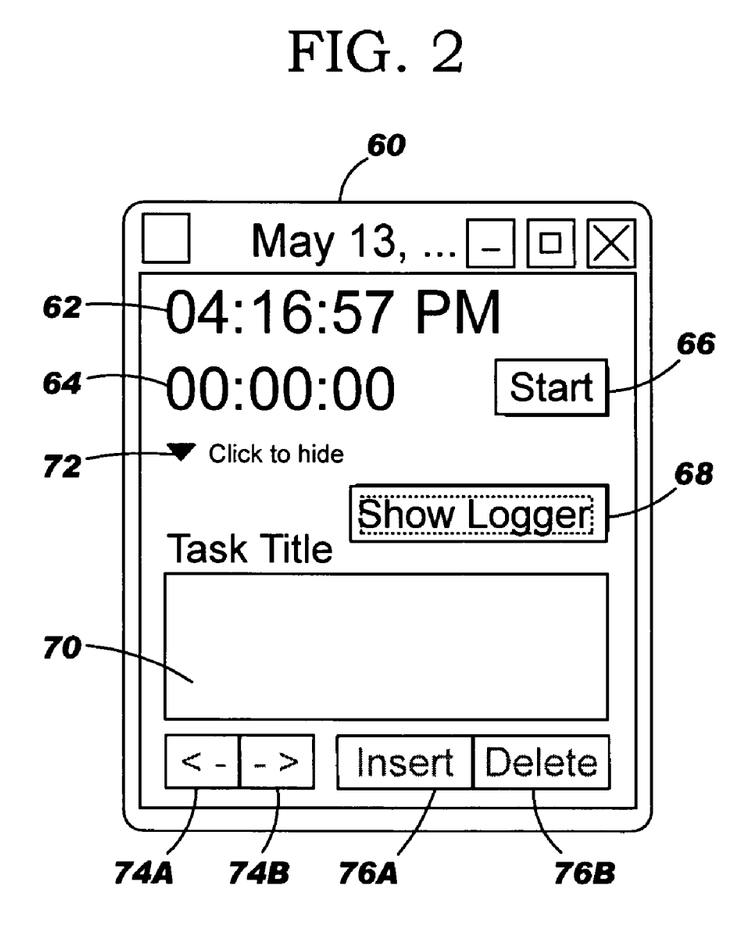
FIG. 2 depicts an illustrative initial GUI according to the present invention.

In any event, when usability data system 36 is initialized, GUI system 38 will provide an initial GUI 60 as shown in FIG. 2. As depicted, initial GUI 60 includes a current time 62 (e.g., a time clock), a timer 64, a timer start button 66, a show logger button 68, a task title field 70 and a hide button 72. Current time 62 and timer 64 are maintained by time clock system 42 of FIG. 1. When presented with initial GUI 60, tester 14 (FIG. 1) can set up the task(s) to be performed by user 18A (FIG. 1) that tester 14 wishes to monitor. Specifically, tester 14 will input a title for each task he/she wishes to monitor into task title field 70. In a typical embodiment, those titles will be displayed in task title field 70 in the order in which they were input by tester 14. Tester 14 can scroll through the list of titles in task title field 70 using navigation buttons 74A-B. Moreover, tester 14 can insert additional titles into the list, or delete titles from the list, using insert button 76A and delete button 76B, respectively. If a task title is longer than task title field 70, it can be made to scroll across task title field 70 at predetermined time intervals (e.g., every 30 seconds). If tester 14 selects (e.g., mouse clicks) hide button 72, task title field 70 will be hidden and only current time 62 and timer 64 will be displayed. Selection of current time 62, will result in a toggling between the current time 62 and a current date (not shown).

Figure 3:
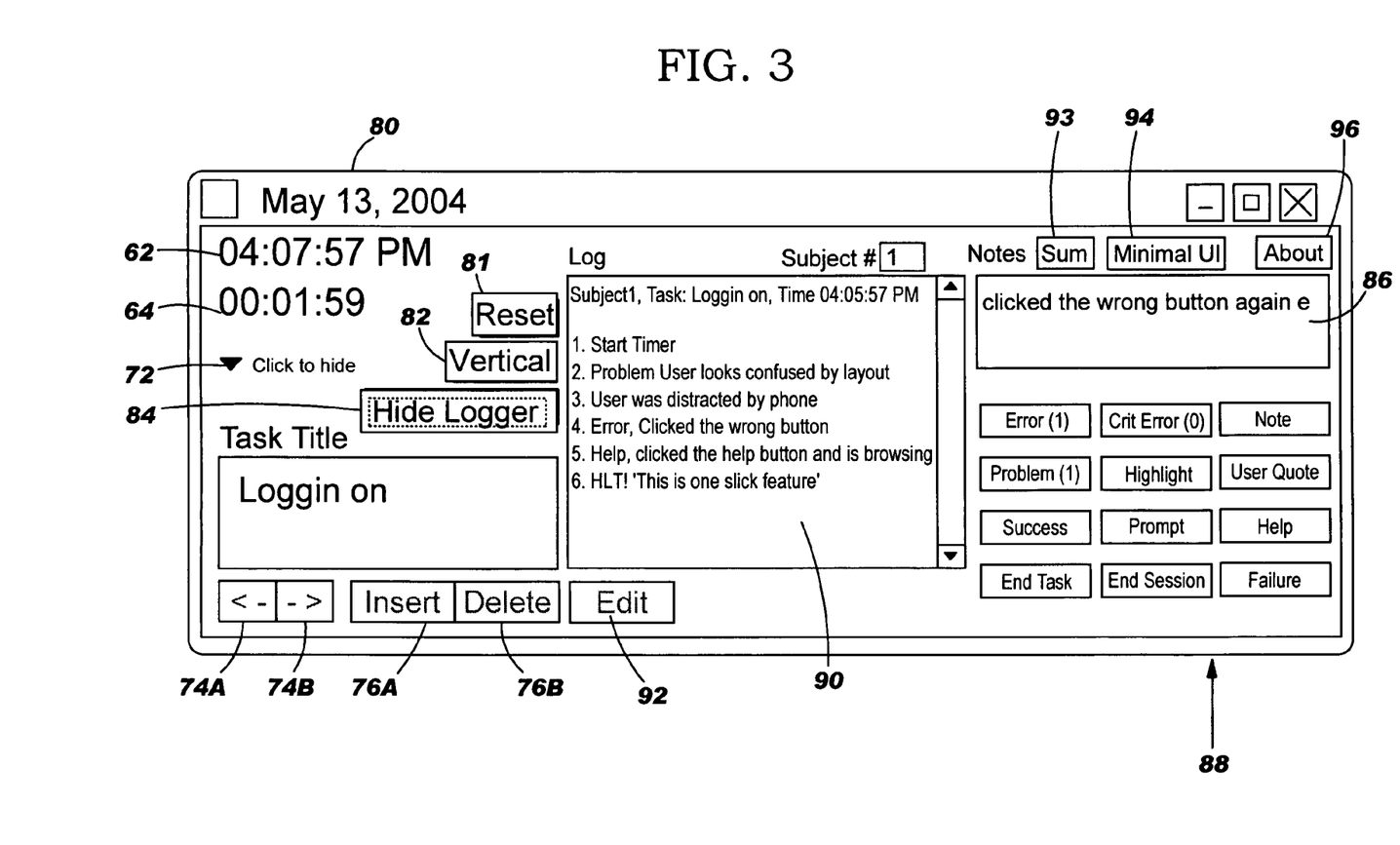
FIG. 3 depicts an illustrative logger GUI according to the present invention in a horizontal orientation.

As will be described in further detail below in conjunction with FIG. 3, timer 64 is typically commenced when user 18A begins a task. As user 18A performs the task, tester 14 can input comments concerning user 18A's performance. Each comment will be associated and logged with both the current time 62 at which the comments were input and the elapsed time as indicated by timer 64. If tester 14 selects timer start button 66 of FIG. 1, timer 64 will start, and a timer reset button (not shown) will appear in place of timer start button 66. Selection of the timer reset button will then reset the timer. Still yet, tester 14 can pause or unpause a running timer 64 by selecting the timer 64 itself.

Figure 4:
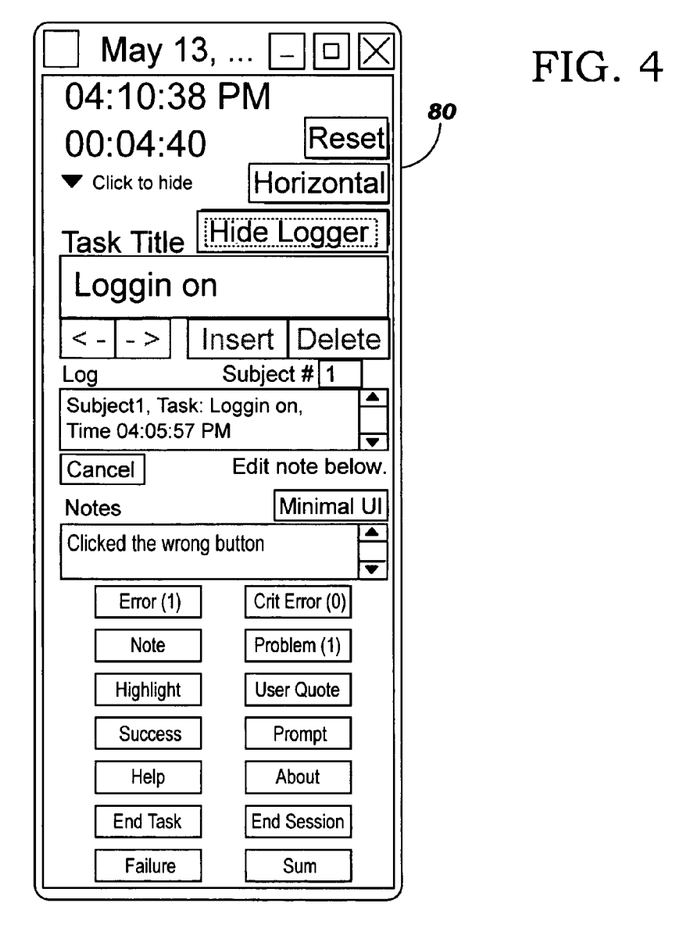
FIG. 4 depicts an illustrative logger GUI according to the present invention in a vertical orientation.

In any event, assume now that tester 14 has input a set of desired tasks into task title field 70. These tasks can be saved by the system for future use. When tester 14 wishes the testing to begin, he/she can select show logger button 68. This selection will result in logger GUI 80 being provided as shown in FIG. 3. As depicted, logger GUI 80 includes many of the features of initial GUI 60 of FIG. 2. For example, logger GUI 80 includes current time 62, timer 64, task title field 70, hide button 72, navigation buttons 74A-B, and insert and delete buttons 76A-B. As further shown, because timer 64 has started, timer start button of FIG. 2 has been changed to a timer reset button 81. Moreover, since logger GUI 80 is currently being shown, the show logger button of initial GUI 60 (FIG. 2) has been changed to a hide logger button 84, the selection of which will result in initial GUI 60 being displayed once again. Logger GUI 80 also includes an orientation button 82. In a typical embodiment, logger GUI 80 will displayed in a horizontal orientation as shown in FIG. 3. However, if orientation button 82 is selected, logger GUI 80 will be displayed in a vertical orientation as shown in FIG. 4. As shown in FIG. 4, the vertical orientation of logger GUI 80 includes the same features as the horizontal orientation shown in FIG. 3.

Figure 5:
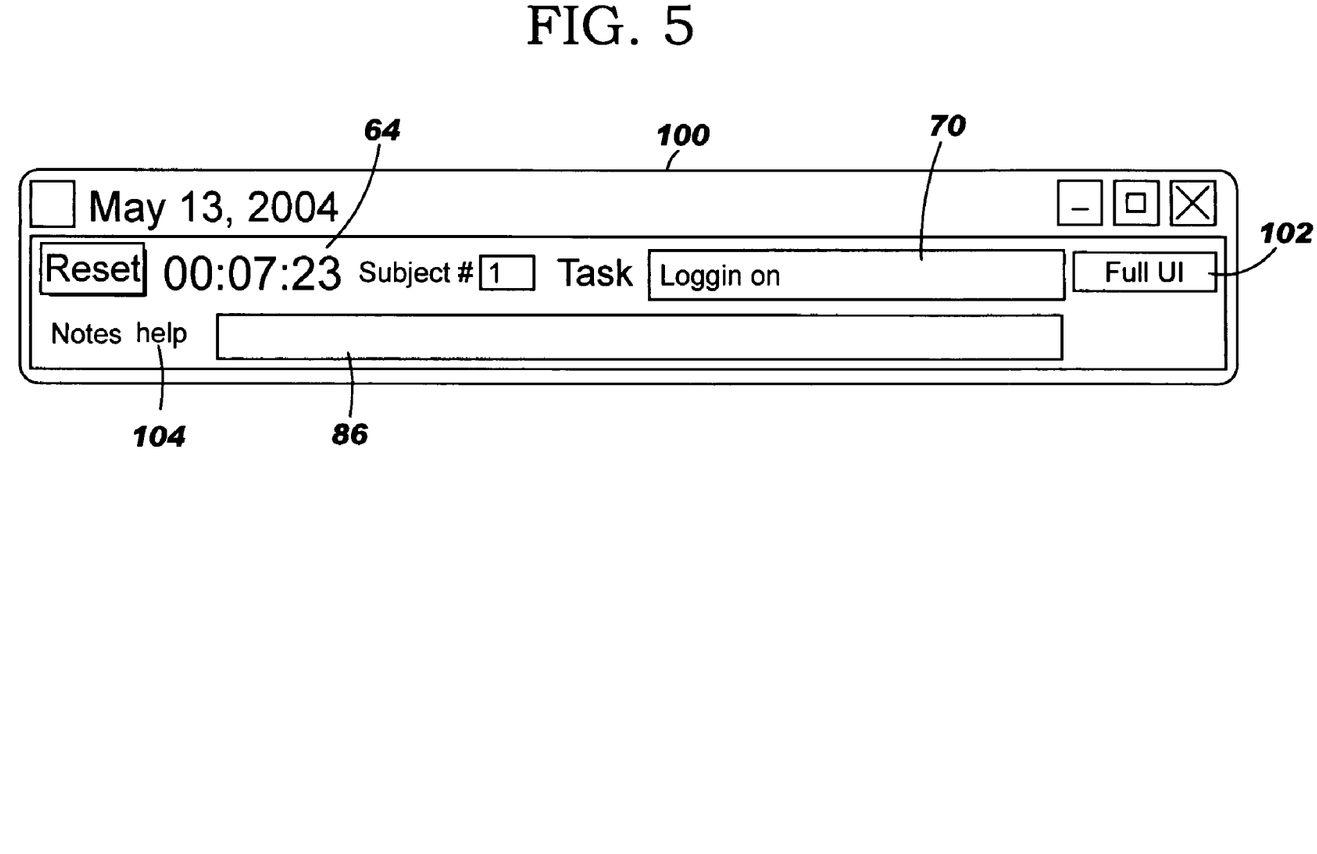
FIG. 5 an illustrative logger GUI according to the present invention in a minimized orientation.
Figure 6:
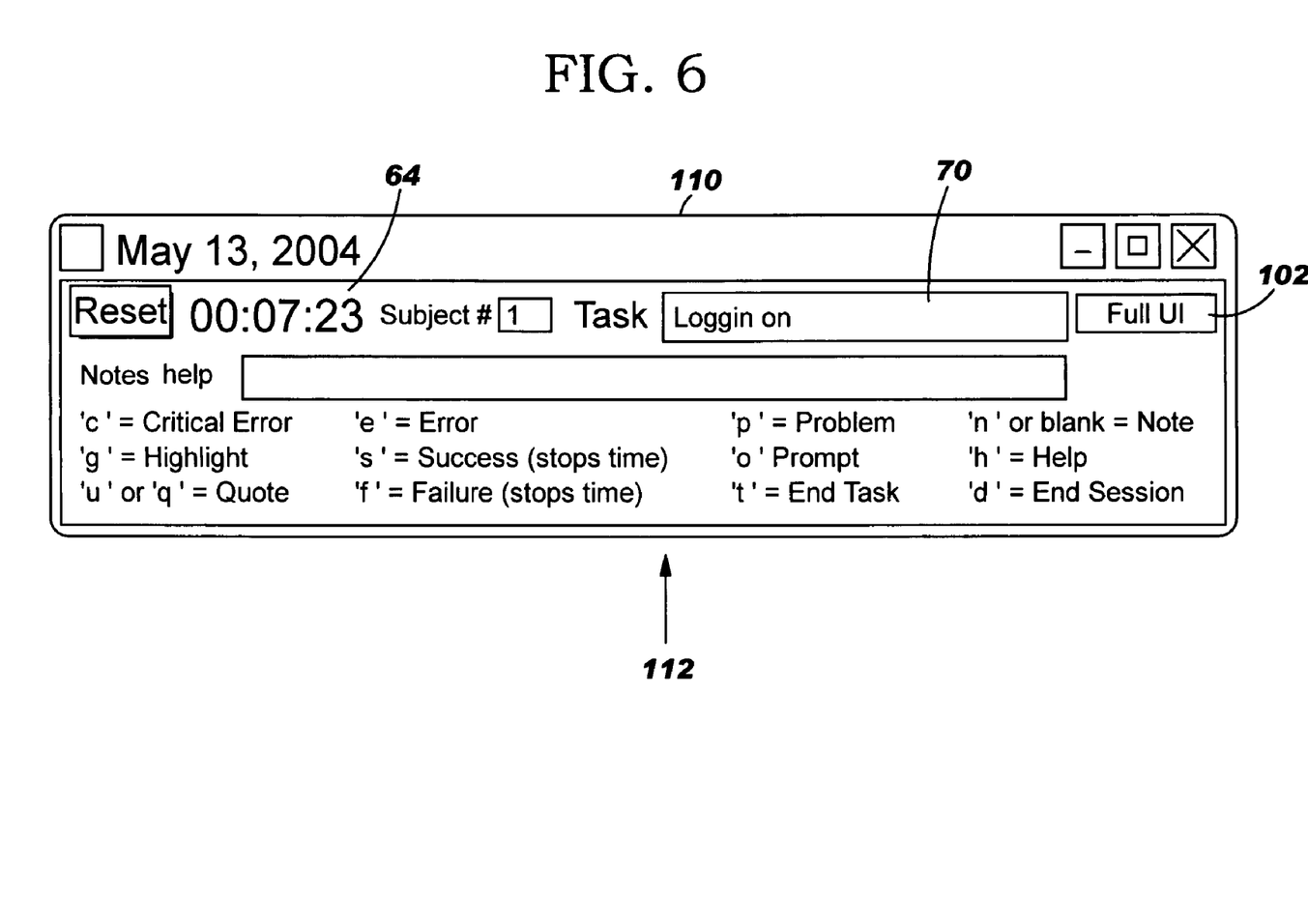
FIG. 6 an illustrative shortcut help GUI according to the present invention.

Referring back to FIG. 3, logger GUI 80 also includes comment entry field 86, comment type buttons 88, log field 90, edit button 92, summary button 93, minimization button 94 and informational (e.g., "about") button 96. If minimization button 94 is selected, logger GUI 90 will be displayed in a minimized orientation as shown in FIG. 5. As depicted, minimized orientation 100 includes timer 64, task title field 70, comment entry field 86, and full orientation button 102. If full orientation button 102 is selected, the full orientation of FIG. 3 or 4 would be displayed. As further shown, minimized orientation 100 does not include the comment type buttons of FIG. 3. As such, tester 14 would use certain typographical shortcuts. These shortcuts can be accessed by selecting help button 104. The shortcuts 112 are shown in shortcut help interface 110 of FIG. 6, which also includes timer 64, task title field 70, comment entry field 86, and full orientation button 102.

Referring back to FIG. 3, assume that tester 14 (FIG. 1) had input a set of tasks to be completed by user 18A (FIG. 1). Further assume that the first such task was for user 18A to log on to a system. As shown, that task is currently displayed in task title field 70. When user 18A begins the task, tester 14 will start timer 64. As demonstrated by timer 64, user 18A is currently one minute and fifty-nine seconds into the "Logging On" task. As user 18A performs the steps in the task, tester 14 will input comments concerning the performance into comment entry field 86. Then, by selecting one of the comment type buttons 88, or by using their equivalent typographical shortcuts, tester 14 can assign each comment a particular type. As will be further explained below, numeric counts will be maintained for certain types of comments. In a typical embodiment, the comment type buttons 88 shown in FIG. 3 have the following meanings.

ERROR—the error button is used if user 18A has committed an error in performing the task. For example, if user 18A made a typographical error in inputting his/he screen name, tester 14 can input a comment to that effect and select the error button.

CRITICAL ERROR—the critical error button is used if user 18A has committed a critical error that results in user 18A failing the task. For example, if user 18A input the wrong password multiple times, tester 14 can input a comment as such and select the critical error button.

NOTE—the note button is used if tester 14 wishes to make a note about the task. For example, if the user 18A's telephone rang during the test, tester 14 could input a comment and select the note button. In a typical embodiment, the note comment type could be the default assigned to the "enter" key.

PROBLEM—the problem button is used if the user 18A did not commit an error, but did something problematic nonetheless. For example, if user 18A followed an inefficient path through an interface, tester 14 could input a comment and select the problem button.

HIGHLIGHT—the highlight button is used to indicate something tester 14 may want to note either positive or negative for review in the future. For example, if several users make the same mistake in performing a task and/or made a good suggestion, tester 14 may want to highlight that fact.

USER QUOTE—the user quote button is used to indicate feedback provided by user 18A. For example, if user 18A indicated that an interface was confusing, tester 14 could input a comment and select the user quote button.

SUCCESS—the success button would be selected to stop the timer and indicate the task has been successfully completed. After selecting the success button, tester 14 will still be allowed in input comments.

FAILURE—the failure button would be selected to stop the timer and indicate the task has been failed by user 18A. Similar to selection of the success button, tester 14 could still input comments after the failure button has been selected.

PROMPT—the prompt button would be used to indicate something tester 14 communicated to user 18A. For example, if tester 14 had to give a hint to user 18A, tester could indicate that in a comment and select the prompt button.

HELP—the help button would be selected if user 18A accessed the help system.

END TASK—the end task button would be selected when user 18A has completed a task. If additional tasks are to be performed, selection of the end task button will automatically proceed to the next task in the list.

END SESSION—the end session button is used to indicate that user 18A has completed all tasks in the session.

It should be understood that these types of comments are intended to be illustrative only and that the teachings described herein could be implemented with other types of comments. Moreover, a default type could be assigned to the "enter" button on a keyboard. For example, if tester 14 inputs comment and hits the "enter" button, the comment could be assigned the type of NOTE by default. In any event, when tester 14 inputs a comment into comment entry field 86, and then indicates a corresponding type (e.g., using type buttons 88 or a typographical equivalent), the comment will be received by input reception system 40 (FIG. 1) and displayed in log field 90. As can be seen in FIG. 3, log field 90 shows a list of comments input by tester 14 during the current task. If tester 14 wishes to edit a comment, he/she can do so by selecting the comment in log field 90 and selecting edit button 92. A comment could also be edited by, for example, double clicking on a comment in log window 90. As the comments are input and assigned a type, usability data will be generated by data generation system 44 of FIG. 1. Specifically, referring back to FIG. 1, time association system 46 will associate each comment with the current time at which the comment as input, as well as with an elapsed time into the task when the comment was input (as indicated by the timer). In addition, numeric count system 48 will maintain a numeric count for certain types of comments. In a typical embodiment, numeric counts are maintained for errors, critical errors and problems. Thus, for example, if tester 14 input three error-type comments, one critical error-type comment, and two problem-type comments, the following counts would be maintained

ERROR—3
CRITICAL ERROR—1
PROBLEM—2

Data collation system 50 will then collate the comments, their associated time values and any numeric counts into the usability data, which could then be stored in a (final) output file by output file system 52. The location of the output file can be revealed (as well as other information about the usability data system 36) by selecting the informational button 96 of FIG. 3. The location of the output file can also be revealed in the title bar of logger GUI 80.

Figure 7:
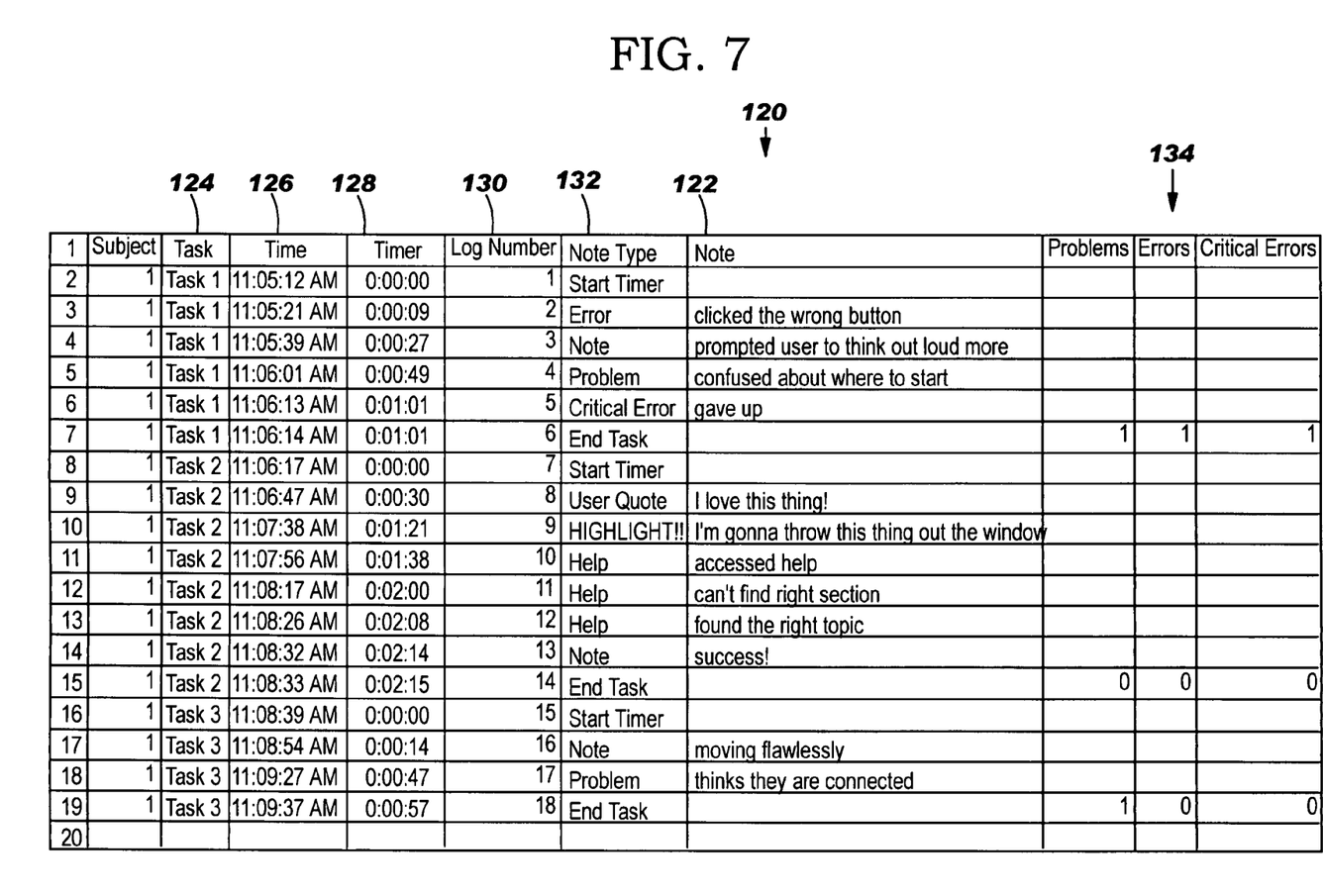
FIG. 7 depicts usability data in an illustrative final output file according to the present invention.

In a typical embodiment, the usability data generated by data generation system is rendered in a table format that can be manipulated using any spreadsheet program (e.g., LOTUS 123, MICROSOFT EXCEL, etc.), as shown in FIG. 7. As depicted, each row of table 120 lists the comment 122 along with its corresponding/associated: task 124, current time 126, elapsed time 128, log number 130 and type 132. Further, the conclusion of each task in table 120 can be accompanied with the pertinent numeric counts 134 (if applicable). This format allows tester 14 to easily parse and analyze the performance of user 18A. The table format also allows tester 14 to sort the results, and/or move the rows/columns as desired.

Figure 8:
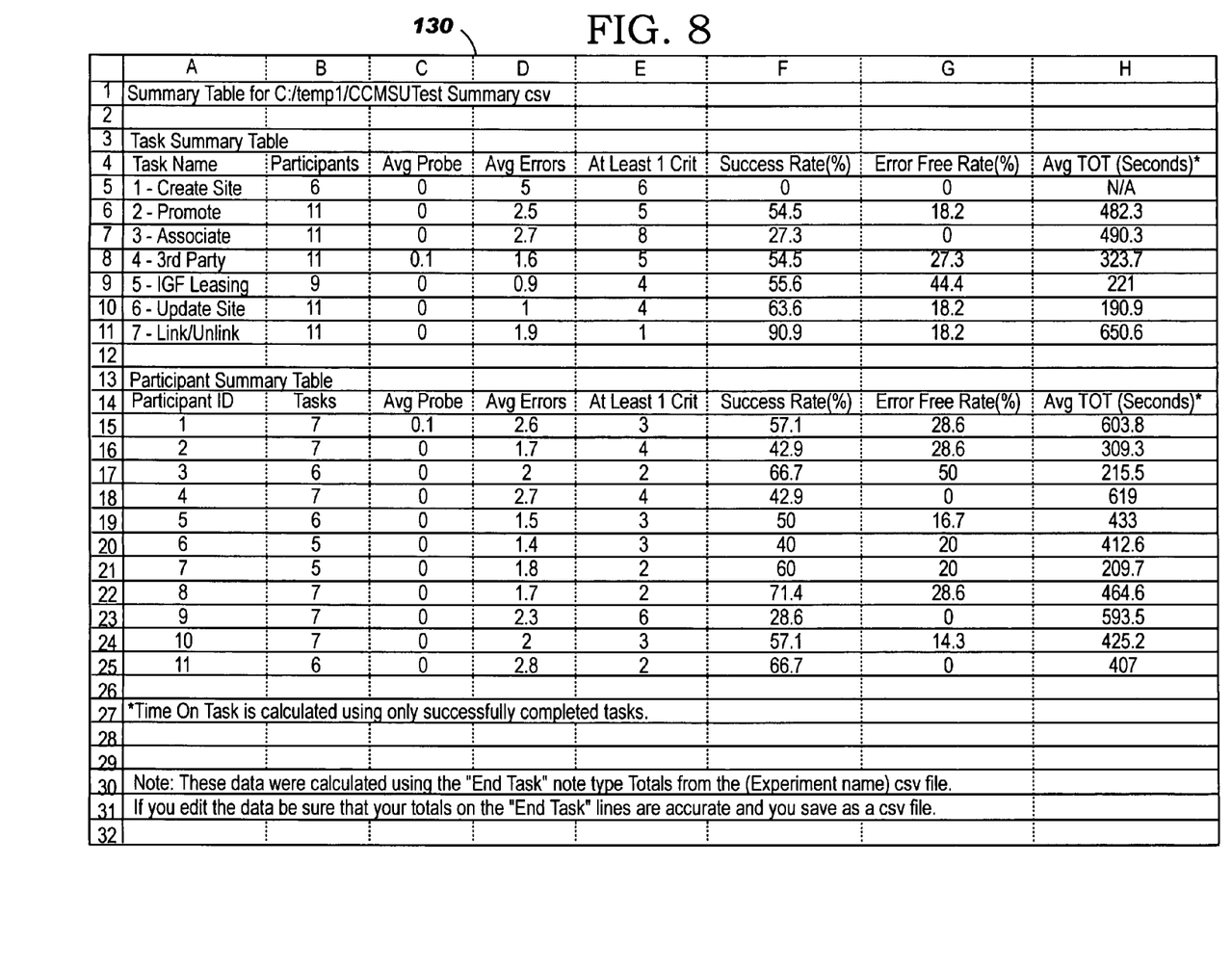
FIG. 8 depicts usability data in an illustrative summary output file according to the present invention.

Referring back to FIG. 3, logger GUI 80 also includes summary button 93. Selection of summary button 93 after comments/data have been collected will result in a summary output file being generated. In general, summary button 93 could be disabled during a session or a task, but made available prior to the logging of an initial comment for a new session or task. Moreover, the summary file will typically be stored in the same directory as the output file discussed above. Referring now to FIG. 8, an illustrative summary output file is depicted. As shown, summary output file resembles a table 130 in structure, and similar to table 120 of FIG. 7, can be manipulated using any spreadsheet program. Table 130 depicts summary information for tester 14. As shown, such information includes, among other things, average problems, average errors, frequency of having at least one critical error, success rate percentages, error free rate percentages, total task time, etc.

It should be understood that the present invention can be realized in hardware, software, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of usability data system 36 of FIG. 1 is intended to be illustrative only. As such, usability data system 36 could be represented by a different configuration of systems. For example, time association system 46, numeric count system 48 and data collation system 50 need not be combined into a single system. In addition, it should be understood that although a typical embodiment of the invention, tester 14 (FIG. 1) will observe remote computer users 18A-C using collaboration software loaded on tester system 12 (FIG. 1), this need not be the case. For example, tester 14 could operate multiple computer systems, one having collaboration system 34, and another having usability data system 36.

The invention claimed is:

1. A computer device having an always on top graphical user interface (GUI) for generating usability data for a remote computer user, the GUI comprising:
    a timer for timing a task of the remote computer user;
    a task title field for displaying a title corresponding to the task;
    a comment entry field for inputting comments corresponding to a performance of the task by the remote computer user during a monitoring session that provides viewing access to the remote computer user performing the task via a collaboration-based software program that is unrelated to the graphical user interface, wherein each of the comments is associated with a corresponding time as indicated by the timer; and
    means for indicating a type of each of the comments, the indicating means comprising a set of typographical shortcuts, which allow identification of the type of comment by typing of a single character, and a set of comment control buttons comprising an error button, a critical error button, a note button, a problem button, a highlight button, a user quote button, a success button, a prompt button, a help button, an end task button, an end session button, and a failure button.

2. The computer device of claim 1, the GUI further comprising a minimization button for toggling the GUI between a full view and a minimal view, wherein the minimal view does not include the set of comment buttons.

3. The computer device of claim 1, the GUI further comprising a orientation button for displaying the GUI vertically or horizontally.

4. The computer device of claim 1, the GUI further comprising a clock for displaying a current time.

5. The computer device of claim 1, the GUI further comprising a reset button for resetting the timer.

6. The computer device of claim 1, the GUI further comprising:
    a log field for displaying the comments; and
    an edit button for editing the comment as displayed in the log field.

7. The computer device of claim 1, wherein the usability data is generated based on the comments and their corresponding types, and wherein the usability data is stored in an output file.

8. The computer device of claim 1, wherein the GUI is displayed on a tester computer system that is remote from a user computer system being operated by the remote computer user.

9. The computer device of claim 1, wherein the task title field is capable of displaying a list of task titles.

10. A method for generating usability data for a remote computer user, comprising:
    providing an always on top graphical user interface (GUI) comprising a timer for timing a task of the remote computer user, a task title field for displaying a title corresponding to the task, a comment entry field for inputting comments corresponding to a performance of the task by the remote computer user, and means for indicating a type of each of the comments, the indicating means including a set of comment control buttons for selecting one of the set of comment buttons for each of the comments inputted into the comment entry field; the indicating means comprising a set of typographical shortcuts, which allow identification of the type of comment by typing of a single character, and a set of comment control buttons comprising an error button, a critical error button, a note button, a problem button, a highlight button, a user quote button, a success button, a prompt button, a help button, an end task button, an end session button, and a failure button;
    initiating a monitoring session that provides viewing access to the remote computer user performing the task via a collaboration-based software program that is unrelated to the graphical user interface;
    inputting comments into the comment entry field as the remote computer performs the task, and assigning a type to each of the comments using the means for indicating; wherein each of the comments is associated with a corresponding time as indicated by the timer; and
    maintaining numerical counts for certain types of comments.

11. The method of claim 10, further comprising generating the usability data based on the inputted comments and their assigned types.

12. The method of claim 10, further comprising storing the usability data in an output file.

13. A system for generating usability data for a remote computer user, comprising:
    at least one computing device;

a GUI system for providing an always on top graphical user interface (GUI) that comprises a timer for timing a task of the remote computer user, a task title field for displaying a title corresponding to the task, a comment entry field for inputting comments corresponding to a performance of the task by the remote computer user, and means for indicating a type of each of the comments;

an input reception system for receiving comments corresponding to the performance of the task by the remote computer user as input into the comment entry field during a monitoring session that provides viewing access to the remote computer user performing the task via a collaboration-based software program that is unrelated to the graphical user interface, and for receiving a type for each of the comments as selected using the means for indicating;

a data generation system for generating the usability data based on the comments and their corresponding types, the data generation system comprising:
- a time association system for associating each of the comments with an elapsed time as indicated by the timer;
- a numerical count system for maintaining a numerical count for certain types of comments; and
- a data collation system for generating the usability data using the comments, the associated times and the numerical counts; and means for indicating a type of each of the comments, the indicating means comprising a set of typographical shortcuts, which allow identification of the type of comment by typing of a single character, and a set of comment control buttons comprising an error button, a critical error button, a note button, a problem button, a highlight button, a user quote button, a success button, a prompt button, a help button, an end task button, an end session button, and a failure button.

14. The system of claim 13, further comprising a time clock system for maintaining the timer.

15. The system of claim 13, further comprising an output file system for storing the usability data in an output file.

16. The system of claim 13, wherein the system is loaded on a tester computer system that is remote from a user computer system being operated by the remote computer user.

17. The system of claim 16, wherein the GUI is displayed on top of any other GUIs being displayed on the tester computer system.

18. A program product stored on a recordable medium for generating usability data for a remote computer user, which when executed, comprises:

program code for providing an always on top graphical user interface (GUI) that comprises a timer for timing a task of the remote computer user, a task title field for displaying a title corresponding to the task, a comment entry field for inputting comments corresponding to a performance of the task by the remote computer user, and means for indicating a type of each of the comments;

program code for receiving comments corresponding to the performance of the task by the remote computer user as input into the comment entry field during a monitoring session that provides viewing access to the remote computer user performing the task via a collaboration-based software program that is unrelated to the graphical user interface, and for receiving a type for each of the comments as selected using the means for indicating;

program code for generating the usability data based on the comments and their corresponding types, wherein each of the comments is associated with a corresponding time as indicated by the timer; and program code for indicating a type of each of the comments, the indicating code implementing a set of typographical shortcuts, which allow identification of the type of comment by typing of a single character, a set of comment control buttons comprising an error button, a critical error button, a note button, a problem button, a highlight button, a user quote button, a success button, a prompt button, a help button, an end task button, an end session button, and a failure button.

19. The program product of claim 18, further comprising program code for maintaining the timer.

20. The program product of claim 18, wherein the program code for generating the usability data comprising:
- program code for associating each of the comments with an elapsed time as indicated by the timer;
- program code for maintaining a numerical count for certain types of comments; and
- program code for generating the usability data using the comments, the associated times and the numerical counts.

21. The program product of claim 18, further comprising program code for storing the usability data in an output file.

22. The program product of claim 18, wherein the program product is loaded on a tester computer system that is remote from a user computer system being operated by the remote computer user.

23. The program product of claim 22, wherein the GUI is displayed on top of any other GUIs being displayed on the tester computer system.

* * * * *

UNITED STATES PATENT AND TRADEMARK OFFICE
CERTIFICATE OF CORRECTION

| | |
|---|---|
| PATENT NO. | : 7,636,892 B2 |
| APPLICATION NO. | : 10/873048 |
| DATED | : December 22, 2009 |
| INVENTOR(S) | : Claude J. Elie |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1186 days.

Signed and Sealed this

Ninth Day of November, 2010

David J. Kappos
*Director of the United States Patent and Trademark Office*